2,964,629

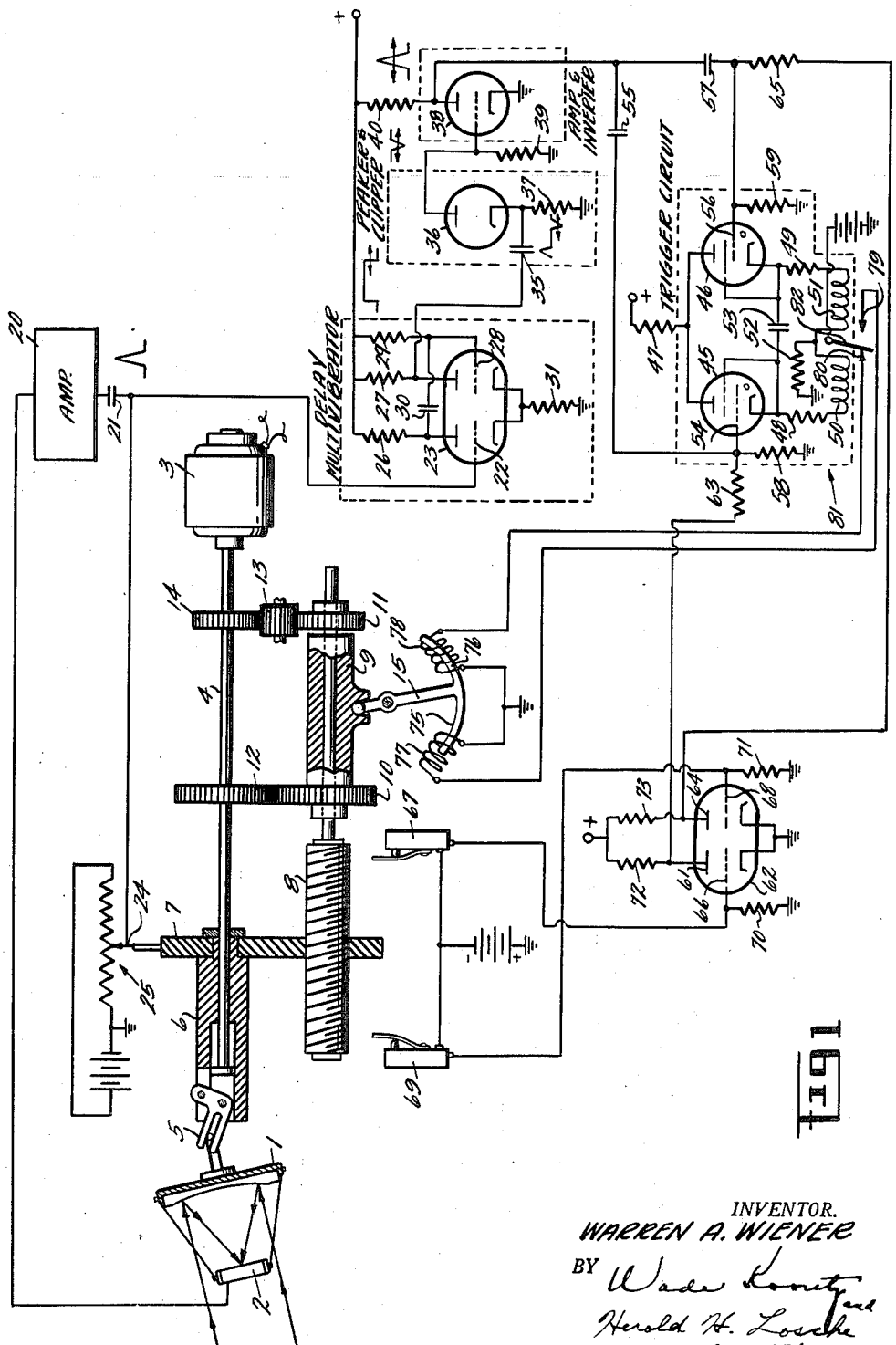

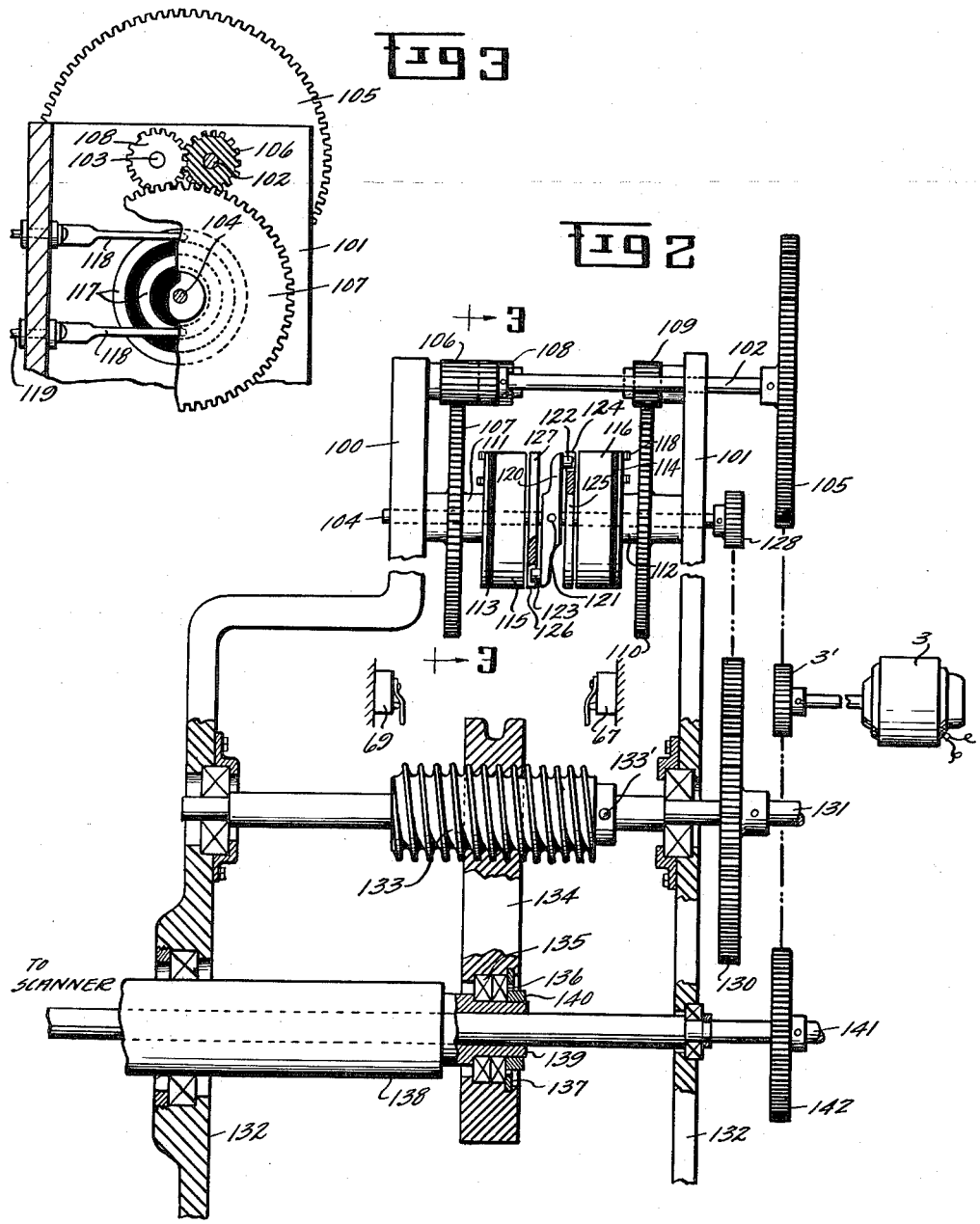

MEANS FOR AUTOMATIC TARGET-LIMITATION OF A TARGET SEEKING SCANNER

Warren A. Wiener, Islip, N.Y., assignor to the United States of America as represented by the Secretary of the Air Force Filed May 25, 1953, Ser. No. 357,180

14 Claims. (Cl. 250—83.3)

This invention relates to means of relatively narrowly framing or bracketing a target in a scanned field, and particularly in a spirally scanned field, whether the target is in the center of the scanned field or near the outer limit thereof. The size of the frame or bracket of the target may be held constant regardless of the relative aspect of the target and this constancy may be maintained whether the scanning speed is variable or not.

In the present invention the automatic target-limitation means is used in connection with a radiation responsive scanning device, and particularly of the spiral scanning type in which the directivity axis of a sensitive element is rapidly swept through a cone of varying angle, as particularly shown and described in the application of Henry Blackstone, Serial No. 307,861, filed on September 4, 1952, now U.S. Patent No. 2,855,521. The automatic target-limitation means is an electrical circuit device that is coupled through an amplifier to the bolometer of the scanner and to a tilt potentiometer responsive to the angular tilt of the scanning device to receive electrical intelligence of a target in the scanned field and from the tilt potentiometer effecting control of the scanner to restrict the scan to a limited spiral trace of the field scanned about the target. The electric means also includes electric clutch means in the power drive shafting of the scanner that drives the scanner through its angular or tilt cycles which clutch means has a reversible drive output by which the tilt sense of the scanner can be reversed at any time as by a target coming in the field of view of the scanner to effect limitation of the scan. In the absence of any intelligence from the scanner, the tilt action of the scanner is limited by the actuation of limit switches in the tilt driving means, the operation of either limit switch being effective in the circuit means to cause a reversal of the clutch means to reverse the tilting sense of the scanner. It is therefore an object of this invention to provide an automatic means to effect the reversal of the angular tilt of a scanning device at the limits of its tilting operation and to effect automatic reversal of the tilt mechanism upon the appearance of a target in the field of scan to cause the scanner to scan only in a limited bracket of the scanned field to provide target discrimination and to increase the frequency of viewing the target.

These and other objects, advantages, features, and uses will become more apparent as the description proceeds when taken in view of the accompanying drawings, in which:

Fig. 1 is a diagrammatic view of the invention in the environment of the scanning device schematically shown;

Fig. 2 is an operative plan view of some of the elements in Fig. 1; and

Fig. 3 is an end elevational view, partly in section, of the reversible clutch means of Fig. 2.

Referring to Fig. 1 the scanning device is shown schematically, providing an environment for this invention, with certain elements thereof made more prominent when they are important to this invention although the scanning device may be of general construction and forms no part of this invention. The scanning device including some of its driving elements consists of a concave reflector 1 and a bolometer or radiation sensitive element 2 positioned at the focus of the reflector 1 and both supported in a universal means (not shown) for nutating movement thereof. The nutating movement is produced by a drive motor 3 operating through a shaft 4 to rotate a bell-crank 5, or the like, linked to the supporting back plate of reflector 1 by a bifurcated portion of the bell-crank slidably interfitting a companion pin on the reflector backing plate. The tilting motion of the reflector 1 and bolometer 2 is provided by a sleeve 6 slidable on the shaft 4 having the outer end thereof pivotally connected to a lateral arm of the bell-crank lever 5. The inner end of the sleeve 6 is journaled in a bar element 7 and restricted against longitudinal or endwise movement relative thereto. The bar element 7 is movable lengthwise along the shaft 4 as by a threaded shaft 8 screw threaded through the bar element 7, the threaded shaft 8 being reversibly driven from the motor 3 through a reversible clutch mechanism. The clutch mechanism is shown in schematic form and may consist of a slide element 9 slidably journaled on an unthreaded portion of the shaft 8, the opposite ends of the slide element having friction faces operative to frictionally engage companion friction faces on respective gears 10 and 11 journaled on the shaft 8. The shaft 8 has abutting collars fixed thereto, one on each side of the gears 10 and 11 opposite the slide element 9. The gear 10 is driven from a gear 12 on the shaft 4 while the gear 11 is driven through an idler gear 13 from a gear 14 on the shaft 4. A lever 15 provides the means to force the slide element 9 to clutch either gear 10 or 11, the clutching of gear 10 causing the shaft 8 to rotate in reverse of that of shaft 4 and the clutching of gear 11 causing the shaft 8 to rotate the same as shaft 4.

An electrical pick-off from the bolometer 2 is passed through an amplifier 20 and a capacitor 21 and is connected to the grid 22 of the first of a double triode tube 23. This first grid 22 is also connected to the movable tap 24 of a potentiometer 25, the movable tap 24 being operated by the bar element 7 in accordance with the tilt of the scanner 1—2. The potentiometer 25 will therefore hereinafter be referred to as the tilt potentiometer. The anodes in the double tube 23 are each connected to a B+ voltage through resistors 26 and 27, and the grid 28 of the second half of the tube is connected to B+ through a resistor 29 and to the plate of the first half of the tube through a condenser 30. The cathode of tube 23 serves both tube halves and is connected to ground through a resistor 31. The tube 23 and its components enclosed by dotted lines constitute a delay one-shot multivibrator.

The anode of the second half of the tube 23 is connected through a condenser 35 to the cathode of a diode tube 36 which cathode is connected to ground through a resistor 37. The anode of the diode tube 36 is connected to the grid of the triode tube 38 which grid is also connected to ground through a resistor 39. The condenser 35 and the resistor 37 operate as a differentiator or peaker network while the diode tube 36 operates as a clipper, this network and tube being enclosed in dotted lines to constitute a differentiator and clipper circuit.

The anode of the triode tube 38 is connected to a B+ voltage through a resistor 40 and also connected into a trigger thyratron circuit. The triode tube 38 operates as an amplifier and an inverter for the signal passed through it and is so designated as enclosed in dotted lines.

The one-shot multivibrator, differentiator and peaker, and amplifier and inverter networks are normally non-conductive but when a target signal is received through the amplifier 20 the one-shot multivibrator is activated which produces a substantially positive square wave output pulse of a duration determined by the grid bias on the grid 22 of the multivibrator. This bias is established by the position of the movable tap 24 of the tilt potentiometer. The trailing edge of the square wave output of the multivibrator therefore varies in accordance with the tilt of the scanner 1—2. The differentiator or peaker network establishes a positive peak corresponding to the leading edge of the square wave and a negative peak corresponding to the trailing edge of the square wave, the negative peak or delayed pulse being the only one permitted to pass out of the clipper diode. The amplifier and inverter pass this delayed pulse on the output thereof as a positive peak, the position thereof in time with respect to the appearance of a target picked up by the sensitive element 2 being determined by the tilt angle of the scanner 1—2.

The trigger circuit consists of a pair of thyratron tubes 45 and 46 having the anodes thereof connected to a B+ voltage source through a resistor 47 and the cathodes thereof connected respectively through resistors 48 and 49, and through electromagnet coils 50 and 51 to a common point which is connected to ground through a resistor 52. The cathodes of each tube are also connected to each other through the capacitor 53 and also each is respectively connected to its screen grid. The output of the amplifier-inverter tube 38 is coupled to the control grid 54 of the thyratron tube 45 through the condenser 55 and to the control grid 56 of the thyratron tube 46 through the condenser 57. Both control grids 54 and 56 are respectively connected to ground through resistors 58 and 59.

The grid 54 is also coupled to the anode 61 in a double triode amplifier tube 62 through the resistor 63, and the grid 56 is coupled to the anode 64 of the double triode tube 62 through the resistor 65. A grid 66 in the double triode 62 is coupled through a limit micro-switch 67 to a biasing voltage source and a grid 68 in the double triode 62 is coupled through a limit micro switch 69 to the biasing voltage source. Each grid 66 and 68 is also connected to ground through resistors 70 and 71, respectively. The anodes 61 and 64 are connected to a voltage supply through resistors 72 and 73, respectively, and the cathode of the double triode 62 is connected to ground. The limit micro-switches 67 and 69 are each positioned in the scanner tilt drive mechanism to be actuated by the bar element 7 in its reversible travel along the screw threaded shaft 8 for a predetermined angular tilt of the scanner 1—2.

The lever 15 for actuating the reversible clutch mechanism 9—11 has opposed armature elements 75 and 76 thereon that are respectively in flux relation with electromagnetic coils 77 and 78, a common connection between these coils being grounded. The coil 77 is connected to a switch contact 79 and the coil 78 is connected to a switch contact 80, the contacts 79 and 80 being the contacts in a double pole-single throw electromagnetic switch, referred to generally by the reference character 81, where the single throw blade 82 is connected to a voltage source capable of energizing the coils of the electromagnet clutch and where the single throw blade operates as an armature between the electromagnetic coils 50 and 51 of the trigger circuit. While the tubes 23 and 62 are shown as being double, such as 6J6 tubes, pairs of single tubes may be used where desirable.

Referring now to Figs. 2 and 3, a description will be given of the specific magnetic reversible clutch mechanism and the tilt mechanism. Fig. 2 shows the relation of the elements as being arranged in a flat plane for the purpose of simplifying the description whereas in actual practice these elements would be clustered to simplify mechanical connections. Elements corresponding to those in Fig. 1 will be given like reference characters.

The magnetic reversible clutch mechanism shown schematically by 10—15 and 75 to 78 in Fig. 1 is shown in Figs. 2 and 3 as having end frame members 100 and 101 with shafts 102, 103, and 104 journaled in these frame ends. The shaft 102 has a spur gear-wheel 105 on the outside of the frame end 101 which is driven by the motor 3 through its pinion 3'. A pinion gear 106 fixed to the shaft 102 is of sufficient length to mesh with a spur gear-wheel 107 journaled on the shaft 104 and another short pinion 108 fixed to the shaft 103. Also fixed to the shaft 103 is a second pinion gear 109 in mesh with a spur gear-wheel 110 journaled on the shaft 104. By this gear arrangement the spur gear-wheel 110 will rotate in the same rotative direction as the spur gear-wheel 105 while the spur gear-wheel 107 is rotated in an angular direction opposite to that of spur gear-wheels 105 and 110. Each spur gear-wheel 107 and 110 has a hub of electrically non-conductive material 111 and 112, respectively, each hub having a flange portion 113 and 114, respectively, that is fixed relative to pole pieces 115 and 116, respectively, which enclose the coils 78 and 77. Electric current is supplied to the coils by slip rings 117 and brushes 118 having external binding posts 119. On the shaft 104 between the two pole pieces is a double ended arm 120, fixed on the shaft as by a pin 121, having opposed fingers 122 and 123 on opposite ends thereof. The finger 122 operates in a radial slot 124 in an armature disc 125 journaled on the shaft 104 while the finger 123 operates in a radial slot 126 in an armature disc 127 journaled on the shaft 104. Energization of either electromagnet will attract the armature 125 or 127, which electromagnets are rotating in opposite directions, to put either rotation into the shaft 104 to rotate the pinion gear 128 fixed thereon outside the frame end 101.

The pinion gear 128 meshes with a spur gear-wheel 130 fixed to a shaft 131 journaled by bearings in a main frame structure 132, only partially shown. On the shaft 131 is a threaded collar 133 fixed thereto by a tapered pin 133'. The collar 133 is threaded through the bar element 134 (corresponding to the bar element 7 schematically shown in Fig. 1). The upper end of the bar element 134 is adapted to engage and actuate micro limit switches 67 or 69 to limit the travel of the bar element 134 along the threaded collar 133. The lower end of the bar element 134 has a shouldered bore 135 transversely therethrough paralleling the shaft 131. Supported in the shouldered bore 135 are frictionless type thrust bearings 136 and retained by a screw threaded ring 137 in the outer threaded portion of the shouldered bore 135. Fixed to the inner races of the thrust bearings 136 is a sleeve member 138 having a shank end 139 passing through the thrust bearings 136 and held in position against a shoulder on the shank by a threaded ring 140. The sleeve 138 is slidable on a shaft 141 having a gear-wheel 142 thereon driven by the motor 3 through the pinion 3' on the motor shaft thereof. The shaft 141, as may be realized from the description of Fig. 1, corresponds to the shaft 4, schematically shown in Fig. 1, and the sleeve 138 corresponds to the sleeve 6 schematically shown in Fig. 1 to provide rotation and tilt angle to the scanner 1—2. It is to be understood that the reversible clutch means has its frame attached to the main frame 132 in actual practice.

In the operation of the device, when the supply current is turned on for all the electrical circuits of the device, assuming that no target appears in the scanned cone, one of the thyratrons 45 or 46 of the trigger circuit will immediately assume conduction over the other to energize the respective coil 50 or 51 making a circuit through the switch 81 to energize the corresponding electromagnet 78 or 77 in the clutch reversing mechanism. This clutch selection puts rotation into the shaft 131 (Fig. 2) to cause the bar element 134 to proceed in one direction. For example, let it be determined here that the thyratron tube 45 first fired to become conductive switching the blade contact 82 to contact 80 as shown in Fig. 1, energizing coil 78 to clutch the clutch mechanism putting rotation in shaft 131 to carry the bar element 134 to the left. If the start was made from the center position, the tilt angle of the scanner 1—2 would proceed from 0 to maximum at which time the limit switch 69 would be actuated putting a grid bias on the grid 68 of the double triode 62 to cause conduction through the plate 64 thereof imposing a grid bias on the thyratron tube 46, grid 56, to produce a current through the cathode circuit and a potential in the capacitor 53 to extinguish the conduction in tube 45. This flopover of conduction energizes switch coil 51 to make contact between blade 82 and contact 79 energizing clutch coil 77 reversing the clutch to drive the shaft 131 in the opposite rotative direction and consequently shifting bar element 134 to the right until limit switch 67 is actuated at which times the left half of the double triode 62 and thyratron 45 again become operative for reversal of the shaft 131 rotation.

During these operations the delay multivibrator, peaker and clipper, and amplifier and inverter have been lying dormant. But upon the detection of a target in the bolometer 2, an electrical impulse is amplified and passed to the grid 22 of the delay one-shot multivibrator tube circuit. The operation of a one-shot multivibrator is well known and will not be discussed further here. Suffice it to state that the multivibrator produces a square wave by reason of grid circuit clipping in the right half of the multivibrator, the trailing edge of which is delayed in correspondence to any increment of voltage added to the signal impulse voltage in accordance with the position of the tilt potentiometer 25 which is positioned directly in accordance with the tilt angle of the scanner 1—2. This intelligence transformed from actual mechanical tilt angulation of the scanner 1—2 into electrical voltages to position the trailing edge of the square wave formed by the multivibrator is vitally important to effecting the limited scan or bracketing of the target.

The square wave on the output of the multivibrator is differentiated or peaked by the condenser 35 and resistor 37, the leading edge of the square wave being represented by a positive peak and the trailing edge being represented by a negative peak. The diode clipper 36 cuts off the positive peak and the negative peak is amplified and inverted in the tube 38. This resulting positive impulse is imposed on the grids 54 and 56 of the thyratrons 45 and 46 which is ineffective on the already conducting tube. This positive impulse on the grid of the nonconducting thyratron tube will produce cathode current to impose a voltage on the capacitor 53 immediately biasing the other thyratron to cut-off. This operation reverses the scan of the scanning elements 1—2 to put the scan back through the target at which time the above operation is again effected to flop over the trigger thyratron circuit. This results in a recycling of the scanner shortly after it passes through the target in either direction of scan and thus causes a greatly increased frequency of view of the target as well as target discrimination. The target is thus bracketed and the tilt potentiometer 25 determines the limits of those brackets for every part of the scan, usually about one-half revolution each way from the target. Since the lower angles of tilt have less scanning length per revolution than the scanning length of the higher tilt angles, the function of the tilt potentiometer is to limit the brackets of scan to about one revolution in accordance with the tilt angle of the scanner 1—2. The tilt potentiometer 25 carries out this function regardless of whether the scanning speed of the scanner is variable or not, as where the scanning speed is made slower near the zero angle of tilt than at the larger angles of tilt.

While the present invention has been illustrated partly with preferred forms it is to be understood that various modifications and changes may be made without departing from the spirit and scope of this invention and I desire to be limited only by the scope of the appended claims.

I claim:

1. In a control system for a radiation responsive scanning device having rotational and angular tilt movement to concentrate a scanning trace throughout a conical field of scan to a bolometer; a drive means for driving the scanning device in its rotational movement and in its angular tilt movement; an electromagnetic reversible clutch means in the drive means of said angular tilt movement adaptable to reverse the tilt movement at any time; and circuit means coupled to said bolometer and to said electromagnetic reversible clutch means operative to reverse said clutch means upon the reception of a target signal from said bolometer, said circuit means having delay means therein to delay the operation of said clutch means sufficient in time to cause reversals in said clutch means whereby the scanning device passes back and forth over the target a constant limited amount.

2. In a control system as set forth in claim 1 wherein said delay means of said circuit means is a one-shot multivibrator with grid circuit clipping means therein to produce a positive square wave with the trailing edge thereof variable with respect to grid bias.

3. In a control system as set forth in claim 2 wherein said circuit means includes a differentiating and clipping network for peaking the leading and trailing edges of said one-shot multivibrator square wave and for clipping said leading edge peak; an inverter for inverting the trailing edge peak of said differentiating and clipper network; and a trigger circuit of a pair of thyratrons with the electromagnetic clutch means in circuit therewith, each thyratron controlling one each of the reversible conditions of said clutch means, one of which thyratrons is normally conducting, and the grid of each thyratron being coupled to the output of said inverter whereby said trigger circuit is triggered to reverse conduction of said thyratrons to reverse said clutch means by said trailing edge peaked pulse from said inverter.

4. In a control system as set forth in claim 3 wherein said electromagnetic reversible clutch means includes a shaft driven by said drive means with means driving a second shaft in reverse direction; each driven and second shaft having means to drive electromagnetic coils, one each coupled to one each of said thyratrons, in opposite directions, each electromagnetic coil having a related armature coupled to an output shaft in driving relation with the angular tilt movement of the scanning device whereby selective conductions of either thyratron energizes the related electromagnetic coil to obtain a corresponding angular rotation of said output shaft.

5. In a control system for a radiation responsive scanning device having rotational and angular tilt movement producing a spiral scan throughout a conical field of view to concentrate the scanned field on a radiant energy sensitive element comprising; a drive means for driving the scanning device in its rotational movement and in its angular tilt movement; an electromagnetically operated reversible clutch means in the drive means of said angular tilt movement adaptable to reverse the angle of tile movement at any time; limit switch means in operative relation with said angular tilt movement drive means between said clutch means and the scanning device; and circuit means coupled to said radiant energy sensitive element, to said electromagnetic operators of said reversible clutch means, and to said limit switches, said circuit means including delay means therein to delay the operation of said reversible clutch means for sufficient time after target signal reception in the circuit means to cause the scanning device to limit the scan in the area of the target whereby the limit switches are operative in the circuit means to cause reversal of the clutch means upon the angular tilt movement drive means driving the scanning device to either of the angular tilt limits thereof and a target signal is operative in the circuit means to cause reversal of the clutch means to limit the scanning operation along the spiral trace within limits to bracket the target.

6. In a control system as set forth in claim 5 wherein said circuit means includes a delay one-shot multivibrator with grid circuit clipping means therein to produce a positive square wave with the trailing edge thereof variable with respect to grid bias; a differentiating and clipping network for peaking the leading and trailing edges of said one-shot multivibrator square wave and for clipping said leading edge peak; an inverter for inverting said trailing edge peak of said differentiating and clipping network; a trigger circuit having a pair of thyratrons, one of which is normally conducting, with the electrical operators of said reversible clutch means in circuit therewith, each thyratron controlling one direction of said reversible clutch means, and the grid of each thyratron being coupled to the output of said inverter for the operation of said trigger circuit to reverse the reversible clutch means whenever a target signal is received from said radiant energy sensitive element with a delay fixed by said multivibrator grid bias to cause the bracketing of the target in a limited trace of the spiral scanning device; and amplifying means to amplify each signal voltage put in circuit through said amplifier from each said limit switch the amplifier output of each said limit switch signal voltage being coupled to one each grid of said thyratrons for triggering the proper thyratron to cause clutch reversal at the limits of angular tilt of said scanning device.

7. In a control system as set forth in claim 6 wherein said electromagnetically operated reversible clutch means includes a shaft driven by said drive means with means driving a second shaft in a reverse rotative direction; each driven and second shaft having means to drive electromagnetic coils journaled on an output shaft, one each coil electrically associated with one each of said thyratrons, and each coil having a related armature coupled to said output shaft which output shaft is in driving relation with the angular tilt movement of the scanning device whereby selective conduction of either thyratron energizes the related electromagnetic coil to obtain a corresponding angular rotation of said output shaft.

8. In a control system for a radiation responsive scanning device having rotational and angular tilt movement producing a spiral scan throughout a conical field of view to concentrate the scanned field on a bolometer comprising; a drive means for driving the scanning device in its rotational movement and in its angular tilt movement; an electromagnetically operated reversible clutch means in the drive means of said angular tilt movement adaptable to reverse the angle of tilt at any time; limit switch means in operative relation with said angular tilt movement drive means between said clutch means and the scanning device; a tilt potentiometer driven by said angular tilt movement drive means between said clutch means and the scanning device; and circuit means having the input thereof coupled to said bolometer and said tilt potentiometer and the output thereof operatively associated with the electromagnetic operators of said reversible clutch means and to said limit switches, said limit switches being operative in said circuit means upon the actuation of either thereof by said tilt movement drive means at the limit of movement thereof to reverse said reversible clutch means, and said circuit means including delay means therein to delay the operation of said reversible clutch means in direct correspondence with the voltage imposed in the input from said tilt potentiometer upon target signal reception to cause repeated reversals of said clutch means to effect a bracket of scan along the spiral trace back and forth across the target.

9. In a control system as set forth in claim 8 wherein said circuit means comprises a delay one-shot multivibrator with grid circuit clipping therein with the grid circuit thereof coupled to said bolometer and said tilt potentiometer to produce a positive square wave upon the reception of a target signal from the bolometer with the trailing edge thereof spaced a distance from the leading edge thereof in accordance with the bias potential placed on said multivibrator grid circuit by said potentiometer; a differentiating and clipping network for peaking the leading and trailing edges of said multivibrator square wave and for clipping the leading edge peak; an inverter for inverting the trailing edge peak of said differentiating and clipping network; a trigger circuit having a pair of thyratrons, of which one is normally conducting, with the electromagnetic operators of said reversible clutch means in circuit therewith, each thyratron controlling one directional condition of said reversible clutch means, and the grid of each thyratron being coupled to the output of said inverter for the operation of said trigger circuit to reverse the reversible clutch means whenever a target signal is received from said bolometer with a time delay in accordance with the tilt angle of the scanning device as established by said tilt potentiometer to cause the bracketing of the target in a limited spiral trace of the scanning device; and amplifying means to amplify each signal voltage placed in circuit from each limit switch, the amplified voltage output of each limit switch being separately coupled to one each grid of said thyratrons to cause clutch reversals at the limits of angular tilt of said scanning device.

10. In a control system as set forth in claim 9 wherein said electromagnetically operated reversible clutch means includes a shaft driven by said drive means with means driving a second shaft in a reverse rotative direction; each driven and second shafts having means thereon to drive electromagnetic coils journaled on an output shaft, one each coil energizably related to one each of said thyratrons, and each coil having a related armature coupled to said output shaft which output shaft is in driving relation with the angular tilt movement of the scanning device whereby selective conduction of either thyratron energizes the related electromagnetic coil to obtain a corresponding angular rotation of said output shaft.

11. In a control system for a radiation responsive scanning device having rotational and angular tilt movement producing a spiral scan throughout a conical field of view to concentrate the scanned field on a bolometer comprising; a drive means for driving the scanning device in its rotational movement and in its angular tilt movement; an electromagnetically operated reversible clutch means in the drive means of said angular tilt movement adaptable to reverse the angle of tilt at any time; a tilt potentiometer driven by said angular tilt movement drive means between said reversible clutch means and the scanning device; and circuit means having the input thereof coupled to said bolometer and said tilt potentiometer and the output thereof operatively associated with the electromagnetic operators of said reversible clutch means, said circuit means including delay means activated in response to potentials from said tilt potentiometer to cause a delay in the target signal operative in said circuit means to effect reversals of the reversible clutch means whereby the target is bracketed in a limited field of spiral scan of the scanning device the bracketing being a predetermined amount in accordance with the position of the target in the spiral trace.

12. In a control system as set forth in claim 11 wherein said circuit means comprises a delay one-shot multivibrator with grid circuit clipping therein with the grid circuit thereof coupled to said bolometer and said tilt potentiometer to produce a positive square wave upon the reception of a target signal from the bolometer with the trailing edge thereof spaced a distance from the leading edge thereof in accordance with the bias potential placed on said multivibrator grid circuit by said potentiometer; a differentiating and clipping network for peaking the leading and trailing edges of said multivibrator square wave and for clipping the leading edge peak; an inverter for inverting the trailing edge peak of said differentiating and clipping network; a trigger circuit having a pair of thyratrons, of which one is normally conducting, with the electromagnetic operators of said reversible clutch means electrically associated therewith, each thyratron controlling one direction of said reversible clutch means, and the grid of each thyratron being coupled to the output of said inverter for the operation of said trigger circuit to reverse the reversible clutch means whenever a target signal is received from said bolometer with a time delay in accordance with the tilt angle of the scanning device as established by said tilt potentiometer to cause the bracketing of the target in a limited spiral trace of the scanning device.

13. In a control system as set forth in claim 12 wherein said operative association between said thyratrons and said electromagnetic operators of said reversible clutch means is an electromagnetic double pole, single throw switch with the electromagnets thereof in the cathode circuit of the thyratrons and the poles thereof in circuit with the electromagnetic operators of said reversible clutch means and a voltage source.

14. In a control system as set forth in claim 13 wherein said electromagnetically operated reversible clutch means includes a shaft driven by said drive means with means driving a second shaft in a reverse rotative direction; each driven and second shaft having means thereon to drive electromagnetic coils journaled on an output shaft, one each coil energizably related to one each of said thyratrons through said electromagnetic switch, and each coil having a related armature coupled to said output shaft which output shaft is in driving relation with the angular tilt movement of the scanning device whereby selective conduction of either thyratron energizes the related electromagnetic coil to obtain a corresponding angular rotation of said output shaft.

References Cited in the file of this patent
UNITED STATES PATENTS

| | | |
|---|---|---|
| 2,446,024 | Porter et al. | July 27, 1948 |
| 2,579,471 | Buckbee et al. | Dec. 25, 1951 |
| 2,606,318 | Haworth et al. | Aug. 5, 1952 |